Figure 1:
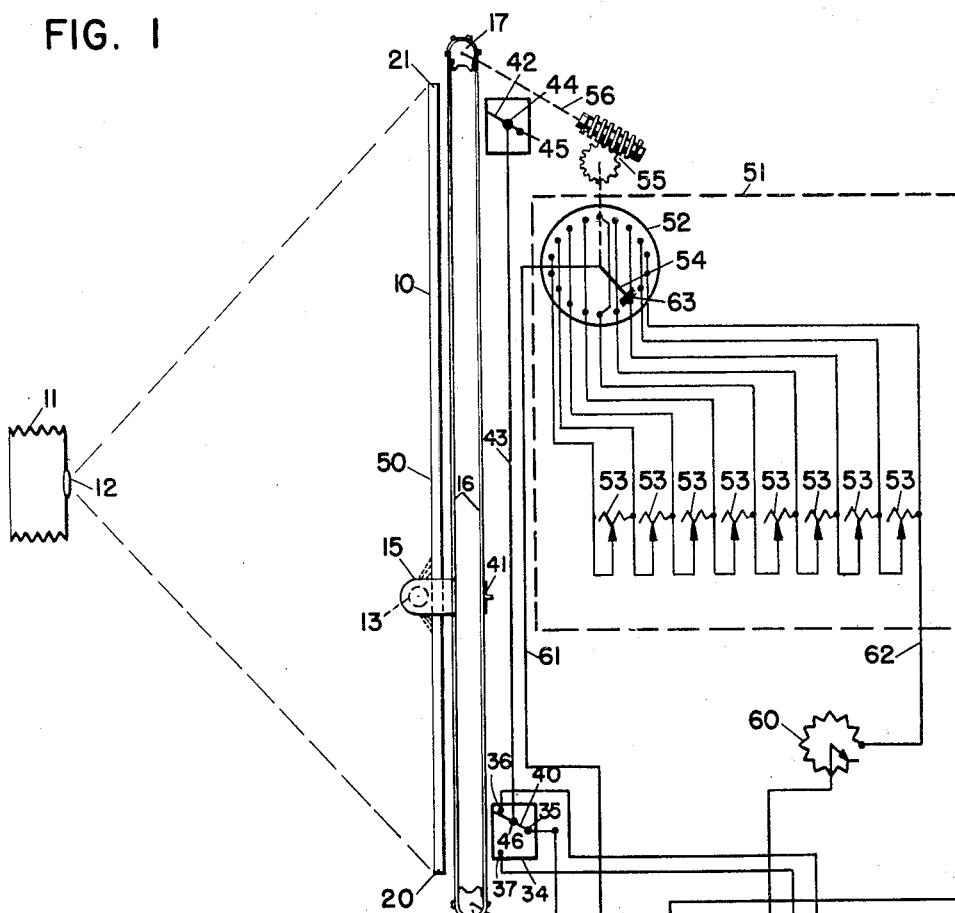

Nov. 8, 1949  G. E. MOEN, JR  2,487,066

SPEED CONTROL FOR MOVABLE ILLUMINATORS

Filed Jan. 30, 1946

INVENTOR.
GEORGE E. MOEN, JR.
BY
[signature]
ATTORNEY

Patented Nov. 8, 1949

2,487,066

UNITED STATES PATENT OFFICE 2,487,066

SPEED CONTROL FOR MOVABLE ILLUMINATORS

George E. Moen, Jr., Bremerton, Wash.

Application January 30, 1946, Serial No. 644,390

6 Claims. (Cl. 88—24)

(Granted under the act of March 3, 1883, as amended April 30, 1928; 370 O. G. 757)

This invention relates to control apparatus, and more particularly to apparatus for controlling speed of a photographic light used to scan an object being photographed by a camera.

In photographic copying of large flat objects such as maps, plans, blue prints and the like, it is customary to provide a movable light which may be passed back and forth across the object being photographed. During this process the camera shutter is open; so that when sufficient time has elapsed, the photographic plate of the camera will have received enough light to satisfactorily expose the film in the camera.

As long as the illumination received on the photographic plate is substantially uniform, the results achieved by the above method are satisfactory. However, when the maximum dimension of the object is relatively large compared to the distance between the camera and the object, the illumination on the edges of the film will be considerably less than at the center thereof, because of the greater distance which the light must travel. That is to say, the distance from the camera lens to the edge of the map, or other object being photographed, may be appreciably greater than the distance from the camera lens to the center of the object. Thus, although the illumination provided by the movable scanning light is uniform over all portions of the object, the illumination on the film of the camera will vary approximately as the inverse of the square of the distance between the camera lens and that portion of the object being photographed at any particular instant.

It is, accordingly an object of this invention to provide apparatus which will produce uniform illumination on a photographic film when used in the copying of a large object illuminated by a moving photographic light.

It is another object of this invention to provide means for controlling the speed of a moving photographic light so that the illumination on the photographic film is essentially uniform in spite of varying distance between the camera lens and the several portions of the object being photographed.

It is a further object of this invention to provide control means for varying the speed of a motor driving a photographic scanning light.

It is another object of this invention to provide speed control means in the energizing circuit of an electric motor driving a photographic scanning light, so that the speed of the scanning light is automatically varied as it traverses its predetermined scanning path.

It is a still further object of this invention to provide a rheostat in the energizing circuit of an electric motor which is effective to vary the speed of the motor as it drives a photographic light successively back and forth past an object being photographed.

Figure 2:
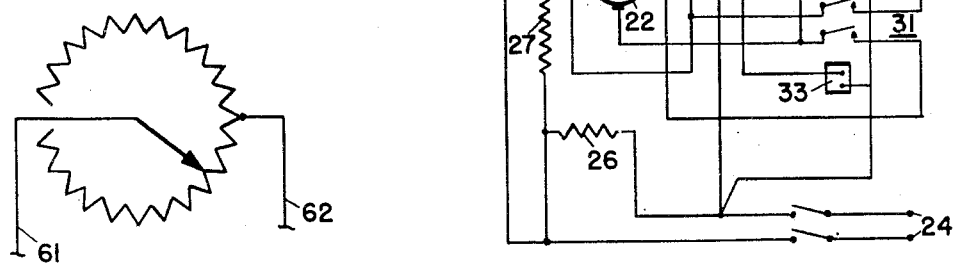

In accomplishing these and other objects of the present invention I have provided improved detail of structure, the preferred form of which is illustrated in the accompanying drawing, wherein:

Fig. 1 is a partly schematic plan of one form of apparatus constructed in accordance with my invention, and Fig. 2 is a schematic illustration of another embodiment of speed control means which may be substituted for the preferred means used in the circuit in Fig. 1.

This invention involves the use of speed control means for controlling the rate of travel of a photographic scanning light, so that during certain portions of its travel the light moves relatively fast, and then slows down progressively in other portions of its travel. The speed control means is actuated by the scanning light itself, so that the speed of the scanning light at any instant depends upon the position of the light at that instant.

A fluorescent photographic light is movably mounted on a chain so that it may be repeatedly passed back and forth in front of an object being photographed. The light is driven back and forth by an electric motor, in the circuit of which is a speed control rheostat. The controlling arm of the rheostat is actuated in synchronism with the reciprocating light. When the light is at the extreme end of the object, i. e. remote from the camera lens, the rheostat causes the motor to turn slowly, thereby permitting a relatively large amount of light to fall on the edges of the object. As the light moves past the center portion of the object, i. e., the portion nearest the camera, the rheostat causes the motor to operate faster, thereby permitting a smaller amount of light to fall on the center portion of the object.

Referring more in detail to the drawing:

In Fig. 1, there is illustrated an easel 10 adapted to hold a map, print, or other flat object which is to be photographed by a camera 11 having a lens 12. Inasmuch as the object being photographed is completely still, there is no objection to using a long time exposure. Under this circumstance it is advisable, in order to save lighting cost, and to provide even illumination, to use a reciprocating light 13, in the form preferably of a fluorescent tube, the end of which is illustrated in Fig. 1. The length of tubular light 13 covers the height of easel 10 (the dimension normal to the plane of the drawing). Holder 15, in which light 13 is mounted, is attached to a continuous chain 16 mounted on the sprockets 17 and 18. It will thus be seen that, by rotation of sprockets 17 and 18, chain 16 may be moved back and forth causing light 13 to move repeatedly from one end 20 of easel 10 to the other end 21 and back again, thus providing photographic light by which a time exposure of an object held on easel 10 may be made in camera 11.

Driving means for sprockets 17 and 18 and chain 16 is provided in the form of an electric motor 22 having a shaft geared to sprocket 18, as represented by dashed line 23. Power for motor 22 is derived from a source 24 of direct current energy. Motor 22 is compound connected and has a shunt field 26 and a series field 27. Polarity of the voltage applied to the armature of motor 22 is determined by relays 30 and 31, having operating solenoids 32 and 33, respectively. It will be understood that when solenoid 32 is energized, relay 30 will be closed, causing motor 22 to turn in one direction; while the energization of solenoid 33 will actuate relay 31 to cause the motor to turn in the other direction.

Selective actuation of relay 30 or 31 is provided by two-way switch 34 having terminals 36 and 37 and a common terminal 35. Selective connection between terminals 35 and 36 or 35 and 37 is made by conducting arm 40. Thus in the position shown, i. e., with arm 40 touching terminal 36, relay 30 is energized, causing motor 22 to turn in a given direction. Actuation of arm 40 to its other position, where it touches terminal 37, de-energizes relay 30 and energizes relay 31 causing motor 22 to turn in the other direction.

Arm 40, located near end 20 of easel 10, is actuated in one direction by a lug 41 fixedly attached to chain 16. It has a counterpart near end 21 in the form of arm 42, pivoted at 45, the two arms being connected by a third arm 43, pivotally connected at its respective ends to arms 42 and 40 at 44 and 46, respectively. It will be readily seen that, as sprocket 18 moves light 13 toward end 21 of easel 10, lug 41 will be concurrently moved toward end 20. As light 13 approaches end 21, lug 41 engages the end of arm 40 moving it from contact with terminal 36 into contact with terminal 37. This reverses motor 22, and causes sprocket 18 to pull light 13 in the other direction. At the other extreme of its travel, light 13 is similarly reversed by the operation of arm 42 acting upon arm 40 through arm 43.

It is to be understood that the height of easel 10 (the dimension normal to the drawing) is relatively small compared with the distance between camera lens 12 and the center 50 of easel 10. However, as may be readily seen, the width of easel 10 (20—21) is relatively large compared to the camera-easel distance (12—50). Thus the intensity of reflected light falling on lens 12 from ends 20 and 21 of easel 10 is considerably less than the intensity of the light from the center 50 of easel 10. When the light 13 is reciprocated past easel 10 at constant speed, the edges of the picture taken by camera 11 will be relatively unexposed compared with the center portion of the picture. This is because light intensity varies approximately as the square of the distance from the source. Since the distances 12—21 and 12—20 are considerably greater than the distance 12—50, it will be seen that in order to provide even exposure of the film in camera 11, means must be provided for causing more light to fall on the edges 20 and 21 of the easel 10 than on the center 50 thereof.

In order to accomplish this variation in illumination of easel 10, there is provided in accordance with this invention a speed control means 51 constituting a rheostat inserted in series with the armature of motor 22. The rheostat comprises a rotatable contact switch 52 having its contacts connected to a number of resistors 53. Arm 54 of contact switch 52 is rotated in synchronism with sprocket 17 and 18 through worm gear 55 and shaft 56. Thus when light 13 is at one of its extreme positions, arm 54 is likewise at one of its extreme positions; and all of the resistors 53 are in series with motor 22, causing it to turn relatively slowly. When light 13 is opposite the center 50 of easel 10, arm 54 is at mid-position, so that all resistors 53 are cut out of the circuit of motor 22, causing it to turn rapidly. As light 13 continues toward its other extreme position, arm 54 likewise continues toward its other extreme position, progressively inserting more resistors 53 into the circuit of motor 22. Each resistor 53 is variable, as shown, so that any desired functional relationship between the speed of motor 22 and the position of light 13 may be obtained.

To permit manual, non-recurring changes in motor speed, another rheostat 60 is provided, also in series with motor 22.

Leads 61 and 62 by which rheostat 51 is connected into the motor circuit are repeated in Fig. 2, wherein there is illustrated another form of speed control rheostat which may be substituted for rheostat 51. In this case, continuously variable motor speed is obtainable, but at the sacrifice of the variable speed-position function which is possible through the variability of resistors 53 in the circuit of Fig. 1.

It will be noted that arm 54 of contact switch 52 has a large contact member 63 on the end thereof. This is provided in order that continuous electric contact may be maintained between arm 54 and at least one of the contact points of switch 52. Were this not so, the circuit would be broken entirely during the operation of the switch and the motor would stop.

Operation

Motor 22 is energized. When light 13 is at one of its extreme positions, the shutter of camera 11 is opened, starting the photographic exposure. Light 13 starts out slowly from the end of easel 10 by virtue of the large resistance introduced in the circuit of motor 22 by resistors 53. As light 13 progresses toward the center 50 of easel 10, switch arm 54 progressively cuts out resistors 53 thereby causing motor 22 to speed up. When light 13 reaches mid-point 50, arm 54 is in the center of its travel; and all of the resistors 53 have been cut out of the circuit motor 22, causing it to turn rapidly. From then on the resistors 53 are progressively re-inserted into the motor circuit, causing it to slow down gradually until the other extreme in the travel of light 13 is reached. At this point, switch 34 is actuated by the hitting of lug 41 against either arm 40 or arm 42, and the rotation of motor 22 is reversed. The cycle is then repeated as many times as desired to obtain the correct exposure; whereupon the shutter of camera 11 is closed, with the film fully and uniformly exposed over its surface.

From the above description it will be seen that there has been provided apparatus for controlling the illumination on an object to be photographed by controlling the speed of a scanning light as it moves back and forth past the object being photographed.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. In a photographic reproduction system including a camera, illuminating apparatus comprising a light, a holder adapted to hold an object to be illuminated by said light, means for effecting relative movement between said light and said holder thereby to cause scanning of said object by said light, motive means, means connecting said motive means and said movement means for effecting driving of said movement means by said motive means, means for varying the operating speed of said motive means, and means responsive to the relative position between said light and said object for actuating said speed varying means as an inverse function of the square of the distance from said camera of that portion of the object illuminated by said light whereby equal amounts of light will be received by said camera from each portion of said object.

2. In a photographic reproduction system including a camera, illuminating apparatus comprising a light, a holder adapted to hold an object to be illuminated by said light, means for effecting relative movement between said light and said holder thereby to cause scanning of said object by said light, an electric motor, a control circuit connected to said motor, means connecting said motor and said movement means for effecting driving of said movement means by said motor, a motor speed control rheostat in said control circuit effective to vary the operating speed of said motor, and means connecting said rheostat to said movement means responsive to the relative position between said light and said object for actuating said rheostat as an inverse function of the square of the distance from said camera of that portion of the object illuminated by said light whereby equal amounts of light will be received by said camera from each portion of said object.

3. In a photographic reproduction system including a camera, illuminating apparatus comprising a light, a holder adapted to hold an object to be illuminated by said light, means for effecting relative movement between said light and said holder thereby to cause scanning of said object by said light, an electric motor, a control circuit connected to said motor, means connecting said motor and said movement means for effecting driving of said movement means by said motor, a motor speed control rheostat in said control circuit effective to vary the operating speed of said motor, and a mechanical connection between said rheostat and said movement means effective to actuate said rheostat in accordance with the scanning position of said light relative to said object for varying the velocity of said light along said object as an inverse function of the square of the distance from said camera of that portion of the object illuminated by said light whereby equal amounts of light will be received by said camera from each portion of said object.

4. In a photographic reproduction system including a camera, illuminating apparatus comprising a light, a holder adapted to hold an object to be illuminated by said light, means for effecting relative movement between said light and said holder thereby to cause scanning of said object by said light, an electric motor, a control circuit connected to said motor, means connecting said motor and said movement means for effecting driving of said movement means by said motor, a motor speed control rheostat in said control circuit effective to vary the operating speed of said motor, said rheostat having an operating member and being so constructed that actuation of said member in a predetermined direction first decreases the impedance of the rheostat and then increases the impedance thereof whereby the speed of said light relative to said holder varies as an inverse function of the square of the distance from said camera of that portion of the object illuminated by said light whereby equal amounts of light will be received by said camera from each portion of said object, and a mechanical connection between said rheostat member and said movement means effective to actuate said rheostat in accordance with the scanning position of said light relative to said object.

5. In a photographic reproduction system including a camera, the combination comprising a light, a holder for holding an object to be illuminated by said light and photographed by said camera, means for moving said light for scanning said object, and means for varying the velocity of the movement of said light during said scanning as an inverse function of the square of the distance from said camera of that portion of the object illuminated by said light whereby equal amounts of light will be received by said camera from each portion of said object.

6. The system according to claim 5, wherein said light moving means includes an electric motor, and wherein said velocity varying means includes a rheostat in the speed control circuit of said motor and means responsive to the scanning position of said light relative to said holder for actuating said rheostat.

GEORGE E. MOEN, JR.

REFERENCES CITED

The following references are of record in the file of this patent:

UNITED STATES PATENTS

| Number | Name | Date |
| --- | --- | --- |
| 1,927,693 | Weisker | Sept. 19, 1933 |
| 2,260,495 | Tutwiler | Oct. 28, 1941 |
| 2,353,512 | Simmon | July 11, 1944 |
| 2,390,065 | Gelb | Dec. 4, 1945 |